United States Patent [19]
Nakano

[11] Patent Number: 6,107,438
[45] Date of Patent: *Aug. 22, 2000

[54] METHOD OF PRODUCING POLYAMIDE RESIN

[75] Inventor: Seiko Nakano, Tsu, Japan

[73] Assignee: M & S Research and Development Co., Ltd., Japan

[*] Notice: This patent is subject to a terminal disclaimer.

[21] Appl. No.: 09/164,467

[22] Filed: Oct. 1, 1998

[30] Foreign Application Priority Data

Oct. 3, 1997 [JP] Japan .................................. 9-271032
Nov. 27, 1997 [JP] Japan .................................. 9-326480

[51] Int. Cl.[7] .......................... C08G 73/10; C08G 69/26; C08G 634/44
[52] U.S. Cl. .......................... 528/170; 528/176; 528/220; 528/229; 528/272; 528/288; 528/292; 528/310; 528/312; 528/317; 528/322; 528/331; 528/335; 528/336; 528/339
[58] Field of Search .......................... 528/310, 170, 528/332, 176, 220, 229, 272, 288, 292, 312, 317, 322, 331, 335, 336, 339

[56] References Cited

U.S. PATENT DOCUMENTS

| | | | |
|---|---|---|---|
| 4,193,896 | 3/1980 | Cook | 528/492 |
| 5,306,786 | 4/1994 | Moens et al. | 525/437 |
| 5,837,803 | 11/1998 | Nakano | 528/332 |

FOREIGN PATENT DOCUMENTS

| | | |
|---|---|---|
| 0 801 090 A1 | 10/1997 | European Pat. Off. . |
| 59-53536 | 3/1984 | Japan . |
| 59-155426 | 9/1984 | Japan . |
| 59-161428 | 9/1984 | Japan . |
| 62-156130 | 7/1987 | Japan . |
| 5-230204 | 9/1993 | Japan . |
| 6-287300 | 10/1994 | Japan . |
| 7-82372 | 3/1995 | Japan . |
| 7-188409 | 7/1995 | Japan . |
| 8-48874 | 2/1996 | Japan . |

*Primary Examiner*—P. Hampton-Hightower
*Attorney, Agent, or Firm*—Wall Marjama Bilinski & Burr

[57] ABSTRACT

A method of producing a polyamide resin by reacting with at least one diamine compound, at least one linear polyester resin consisting of at least one dicarboxylic acid component and at least one diol component and having an intrinsic viscosity of not less than 0.2 dl/g, the at least one diamine compound being used in an amount of 0.5–1.5 mol per 1 mol of the at least one linear polyester resin as calculated in the repeating unit thereof, the linear polyester resin and the diamine compound being reacted in a reaction medium comprising at least one solvent selected from aprotic protophobic polar solvents, so that the at least one diol component of the linear polyester resin is substituted by the diamine compound, resulting in the polyamide resin as a reaction product.

12 Claims, No Drawings

METHOD OF PRODUCING POLYAMIDE RESIN

This application is based on Japanese Patent Applications No. 9-271032 filed on Oct. 3, 1997 and 9-326480 filed on Nov. 27, 1997, the content of which is incorporated hereinto by reference.

BACKGROUND OF THE INVENTION

1. Field of the Invention

The present invention relates in general to a method of producing a polyamide resin. More particularly, the invention is concerned with a method of producing a heat-resistant polyamide resin which has a high molecular weight and which can be molded in a molten state with high stability.

2. Related Art

Nylon 66, 46, 6T and an aramide resin have been mass-produced as a heat-resistant polyamide resin which exhibits excellent mechanical, chemical and physical properties. In general, these nylon 66, 46, 6T and etc. are produced by dehydration and polycondensation of a nylon salt which is obtained by reaction of an organic dicarboxylic acid and an organic diamine. However, this method requires cumbersome process steps, and the polycondensation needs to be effected at a high temperature for a long period of time. In producing the aramide resin, there are some problems: use of expensive organic dicarboxylic dihalide; corrosion of the reaction device due to halogen; difficulty in recycling the material; and contamination of the environment.

The inventor of the present invention proposed in U.S. patent application Ser. No. 08/825,500 filed Mar. 31, 1997, now U.S. Pat. No. 5,837,803 a novel method of producing a polyamide resin by using a polyester resin. This method is totally different from the above-indicated conventional method of producing the polyamide resin by polycondensation, and is free from the problem of corrosion of the reaction device. Explained in detail, according to the proposed method, the conventionally used organic dicarboxylic acid is replaced with the polyester resin. The polyester resin is reacted with, in a predetermined solvent as a reaction medium, a diamine compound whose molar ratio is determined to be in a specified range for the polyester resin. According to the proposed method, the polyamide resin can be obtained in a simplified manner in a relatively short period of time.

For increasing the molecular weight of the polyamide resin obtained according to the proposed method to a sufficiently high extent suitable for practical use, the polyamide resin needs to be subjected to polycondensation in a solid state (hereinafter referred to as "solid-polycondensation) or polycondensation in a molten state (hereinafter referred to as "melt-polycondensation"). Alternatively, it is necessary to increase the reaction temperature and reaction time in an attempt to increase the molecular weight of the polyamide resin. However, the additional step of the solid- or melt-polycondensation undesirably pushes up the cost of manufacture of the polyamide resin, while an increase of the reaction temperature or time causes undesirable problems that the reaction product tends to form an aggregate and adheres to the walls of the reactor, thereby deteriorating the production efficiency of the polyamide resin.

According to the proposed method described above, the polyethylene terephthalate resin (hereinafter referred to as a "PET" resin) is formed into a polyamide resin having a considerably high melting point, such as a polyethylene terephthalamide (whose melting point is 455° C.), a polyphenylene terephthalamide (whose melting point is 420° C.), or a polyhexamethylene terephthalamide (whose melting point is 350° C.).

These polyamide resins, however, had problems when they are molded in a molten state. Since these polyamide resins have considerably high melting points, they cannot be suitably melted if the molding temperature is relatively low. On the other hand, if the molding temperature is excessively high, the polyamide resins suffer from thermal degradation. Thus, the polyamide resins obtained according to the proposed method can not be molded with high stability.

SUMMARY OF THE INVENTION

The present invention was developed in view of the above situations. It is therefore a first object of the invention to provide a novel method of producing a polyamide resin by using a polyester resin, having a high molecular weight suitable for practical use.

It is a second object of the invention to provide a novel method of producing a polyamide resin, in particular, a heat-resistant polyamide resin, exhibiting excellent formability or moldability when it is molded in a molten state.

As a result of an extensive study of the inventor, it was found that the use of a predetermined reaction medium selected from aprotic protophobic polar solvents permits production of a high-molecular polyamide resin without an additional step of solid-polycondensation or melt-polycondensation, and without increasing reaction temperature and time.

On the other hand, the melting point of a high-molecular material depends on the rigidity of its molecular chain. In this respect, it is known that the polyamide resin is formed into a copolyamide resin by introducing in its molecule a low-rigidity site, so that the obtained copolyamide resin can be molded in a molten state with high stability without suffering from thermal degradation (JP-A-59-53536, JP-A-59-155426, JP-A-59-161428, JP-A-62-156130, JP-A-5-230204, JP-A-6-287300, JP-A-7-82372, JP-A-7-188409, and JP-A-8-48874).

In view of the above, the inventor of the present invention found that a reaction of a polyalkylene terephthalate resin mixed with a predetermined amount of a dicarboxylic ester compound, with a diamine compound leads to a slight-reduction of the melting point of the polyamide resin to be obtained, to thereby assure easy handling of the polyamide resin while it is molded in a molten state.

The present invention was made based on the above findings, and the above first object of the invention may be attained according to a first aspect of the invention which provides a method of producing a polyamide resin by reacting with at least one diamine compound, at least one linear polyester resin consisting of at least one dicarboxylic acid component and at least one diol component and having an intrinsic viscosity of not less than 0.2 dl/g, the at least one diamine compound being used in an amount of 0.5–1.5 mol per 1 mol of the at least one linear polyester resin as calculated in the repeating unit thereof, the linear polyester resin and the diamine compound being reacted in a reaction medium comprising at least one solvent selected from aprotic protophobic polar solvents, so that the at least one diol component of the linear polyester resin is substituted by the diamine compound, resulting in the polyamide resin as a reaction product.

According to the method described above, the use of the aprotic protophobic polar solvent as the reaction medium permits the diol component of the linear polyester resin to be effectively substituted by the diamine compound, whereby the obtained polyamide resin has a considerably high molecular weight.

In a preferred form of the above first aspect of the invention, the linear polyester resin is a thermoplastic polyalkylene terephthalate resin. The thermoplastic polyalkylene terephthalate resin may be a polyethylene terephthalate (PET) resin. The polyethylene terephthalate resin may be a recycled polyethylene terephthalate resin.

The above second aspect of the present invention may be attained according to a second aspect of the invention, which provides a method of producing a polyamide resin by reacting with at least one diamine compound, an ester composition which consists of: (A) 100 parts by weight of at least one polyalkylene terephthalate resin consisting of at least one dicarboxylic acid component and at least one diol component; and (B) 10–100 parts by weight of at least one dicarboxylic ester, the diamine compound being used in an amount of 0.5–1.5 mol per 1 mol of the ester composition wherein the polyalkylene terephthalate resin is calculated in the repeating unit thereof, the ester composition and the diamine compound being reacted in a reaction medium comprising at least one solvent selected from the group consisting of hydrocarbons, halogenated hydrocarbons, ethers, acetals and aprotic protophobic polar solvents.

1 mol of the ester composition is a sum of a molar amount of the at least one polyalkylene terephthalte resin as calculated in the repeating unit thereof, and a molar amount of the at least one dicarboxylic ester.

According to the method described above wherein the ester composition consisting of the at least one polyalkylene terephthalate resin and the at least one dicarboxylic ester reacts with the diamine compound, the diol component in the polyalkylene terephthalate resin is substituted with the diamine compound, so that the reaction product is polyamidated. Further, it is speculated that the dicarboxylic acid component of the dicarboxylic ester is effectively introduced at a suitable interval in the molecule chain of the obtained polyamidated product, whereby the melting point of the obtained polyamide resin is effectively lowered so as to improve its moldability.

The above second aspect of the invention may include a step of effecting polycondensation in a solid state or molten state so as to increase the degree of polymerization of the reaction product.

DETAILED DESCRIPTION OF THE PREFERRED EMBODIMENT

The linear polyester resin used in the present method of producing the polyamide resin is obtained by polycondensation of a dicarboxylic acid component formed of an organic dicarboxylic acid or its derivative, and a diol component formed of a dihydric alcohol compound or dihydric phenol compound. Examples of the organic dicarboxylic acid or its derivative are: an aromatic dicarboxylic acid and its derivative such as terephthalic acid, isophthalic acid, phthalic acid, dimethyl terephthalate, terephthalic acid dichloride, diphenyl dicarboxylic acid or naphthalene carboxylic acid; and an aliphatic dicarboxylic acid and its derivative such as oxalic acid, succinic acid, adipic acid, sebacic acid, maleic acid and fumaric acid. Examples of the dihydric alcohol compound are: alkylene glycol such as ethylene glycol, propylene glycol, butane-1, 3-diol, butane-1,4-diol and tetramethylene glycol; and cyclohexanediol. As the dihydric phenol compound, bisphenol-A is used, for instance. Any one of, or any combination of, those dicarboxylic acid components may be used. Similarly, any one of, or any combination of, the diol components as described above may be used.

In the present invention, it is preferable to use, as the linear polyester resin, a polyalkylene terephthalate resin which is formed of the terephthalic acid as the dicarboxylic acid, and the alkylene glycol as the dihydric alcohol, such as ethylene glycol or butane-1,4-diol. It is more preferable to use a polyethylene terephthalate resin (hereinafter referred to as "PET" resin), in particular, a recycled PET resin.

The polyalkylene terephthalate resin which cooperates with the dicarboxylic ester to provide the ester composition is obtained by polycondensation of not less than 70 mol % of a dicarboxylic acid component formed of terephthalic acid or its derivative, and not less than 70 mol % of a diol component formed of alkylene glycol such as ethylene glycol, propylene glycol, butane-1, 3-diol, butane-1,4-diol or tetramethylene glycol. Any one of or any combination of the dicarboxylic acid component may be used. Similarly, any one of or any combination of the diol component may be used.

In the present invention, two or more of the polyester resins or the polyalkylene terephthalate resins may be used in combination. Further, the polyester resin or the polyalkylene terephthalate resin may contain an organic polymer or an inorganic compound.

Examples of the organic polymer contained in the polyalkylene terephthalate resin are polyethylene, polypropylene, ethylene-propylene copolymer, ethylene-vinyl acetate copolymer, chlorinated polyethylene, polybutadiene, butyl rubber, polystyrene, styrene-acrylonitrile-butadiene terpolymer, polyvinyl chloride, polyoxymethylene, polyamide and polyphenylene oxide. Examples of the inorganic compound include talc, mica, calcium carbonate, titanium oxide, carbon black, alumina, glass beads, glass fiber and carbon fiber.

The polyester resin or the polyalkylene terephthalate resin used in the present invention needs to have an intrinsic viscosity of not less than 0.2 dl/g, preferably not less than 0.3 dl/g, as measured at the temperature of 30° C. by using hexafluoroisopropanol (hereinafter referred to as HFIP) as the solvent. The intrinsic viscosity of the polyester resin or the polyalkylene terephthalate resin lower than the lower limit of 0.2 dl/g undesirably lowers the intrinsic viscosity of the polyamide resin to be obtained. In this case, the polymerization degree of the polyamide resin is not sufficiently increased even after the polyamide resin is subjected to the solid-polycondensation or the melt-polycondensation. Therefore, the obtained polyamide resin does not have an industrially effectively high molecular weight.

Although the form of the polyester resin or the polyalkylene terephthalate resin used in the present invention is not particularly limited, it is preferable that the polyester resin or the polyalkylene terephthalate resin be in the form of a powder having an average grain size of not larger than 2 mm, preferably not larger than 1 mm. The water content of the polyester resin or the polyalkylene terephthalate resin is generally not more than 1000 ppm, preferably not more than 500 ppm.

The dicarboxylic ester which cooperates with the polyalkylene terephthalate resin to provide the ester composition used in the present invention is ester of an aliphatic or aromatic dicarboxylic acid such as isophthalic acid, phthalic acid, succinic acid, adipic acid, sebacic acid, maleic acid or fumaric acid, and a monohydric alcohol such as methyl alcohol, ethyl alcohol, propyl alcohol, isopropyl alcohol or butyl alcohol. Examples of the dicarboxylic ester include: dimethyl isophthalate, diethyl isophthalate, dibutyl isophthalate, dimethyl phthalate, dimethyl succinate, dimethyl adipate, diethyl adipate, dimethyl sebacate, dimethyl maleate and dimethyl fumarate. Any one of or any combination of the dicarboxylic esters as described above may be used.

In the present invention, the dicarboxylic ester is mixed with the poly,alkylene terephthalate resin in an amount of 10–100 parts by weight per 100 parts by weight of the polyalkylene terephthalate resin. If the amount of the dicarboxylic ester is lower than 10 parts by weight, the obtained polyamide resin does not enjoy the advantage of the present invention, which is attained by addition of the dicarboxylic ester. On the other hand, if the amount of the dicarboxylic ester exceeds 100 parts by weight, the obtained polyamide resin suffers from considerably lowered heat-resistance. The water content of the dicarboxylic ester is generally not more than 1000 ppm, preferably not more than 500 ppm.

Examples of the diamine compound which reacts with the linear polyester resin, or the ester composition consisting of the polyalkylene terephthalate resin and the dicarboxylic ester are the following: aliphatic diamines such as ethylene diamine, trimethylene diamine, tetramethylene diamine, pentamethylene diamine, hexamethylene diamine, octamethylene diamine, and dodecamethylene diamine; aromatic diamines such as p-phenylene diamine, m-phenylene diamine, o-phenylene diamine, m-toluylene diamine, p-xylylene diamine, m-xylylene diamine, 4,4'-diamino diphenyl methane, 4,4'-diamino biphenyl, 3,3'-dimethyl-4, 4'-diamino biphenyl, 3,3'-dichloro-4,4'-diamino biphenyl, 4,4'-diamino diphenyl ether, 4,4'-diamino diphenyl propane, 4,4'-diamino diphenyl sulfone, 4,4'-diamino diphenyl sulfide, 4,4'-diamino benzanilide, 3,3'-dimethyl-4,4'-diamino diphenyl methane, 3,3'-diethyl-4,4'-diamino diphenyl methane, 4,4'-diamino anthraquinone, 3,3'-dimethoxybenzidine, α,α'-bis (4-aminophenyl)-p-isopropylbenzene, 1,5-diamino naphthalene, and 2,6-diamino naphthalene; alicyclic diamines such as 1,3-diamino cyclohexane, 1,4-diamino cyclohexane, 1,3-bis(aminomethyl)cyclohexane, isophorone diamine, piperazine, 2,5-dimethyl piperazine, bis(4-aminocyclohexyl) methane, bis(4-aminocyclohexyl) propane, 4,4'-diamino-3,3'-dimethyl dicyclohexylmethane, α,α'-bis(4-aminocyclohexyl)-p-diisopropylbenzene, α,α'-bis(4-aminocyclohexyl)-m-diisopropylbenzene, and menthane diamine; and amino-modified polymer such as diamino polysiloxane. Any one of, or any combination of, the diamine compounds as described above may be used.

The amount of the diamine compound used in the reactions according to the present invention is in the range of 0.5–1.5 mol, preferably in the range of 0.7–1.3 mol, more preferably in the range of 0.8–1.2 mol, for 1 mol of the polyester resin as calculated in the repeating unit thereof, or for 1 mol of the ester composition wherein the polyalkylene terephthalate resin is calculated in the repeating unit thereof. If the amount of the diamine compound is less than 0.5 mol, the obtained polyamide resin does not exhibit satisfactory heat resistance. On the other hand, if the amount of the diamine compound exceeds 1.5 mol, the molecular weight of the obtained polyamide resin is undesirably low, or the polyamide resin tends to be gel which is insoluble and infusible after the polyamide resin is subjected to the solid-polycondensation or melt-polycondensation. The water content of the diamine compound is generally not more than 1000 ppm, preferably not more than 500 ppm.

The reaction medium used in the amidation reaction between the linear polyester resin and the diamine compound is an aprotic solvent, in particular, an aprotic protophobic polar solvent. The aprotic protophobic polar solvent is defined in "Solvent Handbook", p.71, edited by Shozo Asahara et al., and published by Kodansha, Japan. In detail, the aprotic protophobic polar solvent does not substantially emit protons, and is a polar solvent which is not likely to effect salvation of cations. The polar solvent is defined as a solvent having dielectric constant or permittivity of not lower than 20 at room temperature. Examples of the aprotic protophobic polar solvent include acetonitrile, sulfolane, 3-sulfolane and N-methylpyrrolidone.

Any one of or any combination of the aprotic protophobic polar solvents described above may be used. The aprotic protophobic polar solvent may be used in combination with other solvents, as long as the property of the aprotic protophobic polar solvent is not lost by the combined use with the other solvents. The water content of the solvent as the reaction medium is not more than 10000 ppm, preferably not more than 5000 ppm. The amount of the reaction medium is in the range of 100–5000 parts by weight, preferably 500–3000 parts by weight, per 100 parts by weight of the polyester resin. If the amount of the reaction medium is less than 100 parts by weight, the polyester resin is not sufficiently dispersed in the reaction medium, and the reaction does not proceed homogeneously. On the other hand, the amount of the reaction medium exceeding the upper limit of 5000 parts by weight makes the reaction system dilute, so that the reaction of the polyester resin and the diamine compound does not sufficiently proceed.

The reaction medium used in the amidation reaction between the ester composition consisting of the polyalkylene terephthalate resin and the dicarboxylic ester, and the diamine compound is selected from the following solvents: aliphatic, aromatic, aliphatic-aromatic, or alicyclic hydrocarbons such as n-butane, i-butane, n-pentane, 2-methylbutane, 2,2-dimethylpropane, n-butylpentane, 3-methylpentane, 2,2-dimethylbutane, n-hexane, 2-methylpentane, 3-butylpentane, 2,3-dimethylbutane, n-heptane, 2-methylhexane, 3-methylhexane, 2,3-dimethylpentane, n-octane, n-nonane, n-decane, isodecane, n-tridecane, benzene, toluene, xylene, ethylbenzene, cumene, n-propylbenzene, n-butylbenzene, n-octylbenzene, dodecylbenzene (linear, branched), cyclopentane, cyclohexane, decalin, tetralin, methylcyclopentane, and methylcyclohexane; halogenated hydrocarbons such as 1,2-dichloroethane, 1,1,1-trichloroethane, chlorobenzene, p-chlorotoluene, o-dichlorobenzene, m-chlorobenzene, p-chlorobenzene, 3,4-dichlorotoluene and 1,2,3-trichlorobenzene; ethers and acetals such as diethylether, dipropylether, dibutylether, dihexylether, ethylvinylether, butylvinylether, anisole, phenetole, butylphenylether, pentylphenylether, methoxytoluene, benzylethylether, diphenylether, dibenzylether, trioxane, 2-methylfuran, tetrahydrofuran, 1,2-dimethoxyethane, 1,2-diethoxyethane, 1,2-dibutoxyethane, diethyleneglycoldimethylether, diethyleneglycoldiethylether, diethyleneglycoldibutylether, triethyleneglycoldiethylether, and diethylacetal; and the above-indicated aprotic protophobic polar solvents such as acetonitrile, sulfolane, 3-sulfolane and N-methylpyrrolidone. Any one of, or any combination of, the above-indicated solvents may be used. In the present invention, petroleum ether, petroleum benzene, gasoline, kerosene or solvent naphtha may be used as the reaction medium. The water content of the solvent used in the amidation reaction between the ester composition consisting of the polyalkylene terephthalate resin and the dicarboxylic ester, and the diamine compound is generally not more than 10000 ppm, preferably not more than 5000 ppm.

It is not preferable to use, as the reaction medium of the present invention, aldehydes, ketones, esters, carboxylic acids, alcohols and water which are usually used as the solvent since these solvents tend to react with the diamine compound or hydrolyze the polyester resin.

In producing the polyamide resin by using the linear polyester resin, the linear polyester resin and the diamine compound as the reaction materials, and the suitably selected solvent as the reaction medium are put into a suitable container having stirring or agitating means, and the mixture is heated, whereby a desired reaction is proceeded. In this reaction, either the batch method or continuous method is suitably employed.

In producing the polyamide resin by using the ester composition consisting of the polyalkylene terephthalate resin and the dicarboxylic ester, the ester composition and the diamine compound as the reaction materials, and the suitably selected solvent as the reaction medium are put into a suitable reactor having stirring or agitating means, and the mixture is heated, whereby the diol component of the polyalkylene terephthalate resin and the monohydric alcohol component of the dicarboxylic ester is substituted with the diamine compound. Further, in this reaction, a portion of an aliphatic or aromatic dicarboxylic acid component of the dicarboxylic ester is introduced into the molecule chain of the reaction product, so that the reaction product is copolyamidated. In this reaction, either the batch method or continuous method is suitably employed.

The temperature at which the reaction is effected varies depending upon the reaction pressure, reaction time, agitating state of the mixture in the reactor and the form of the polyester resin or the ester composition (resin), as well as the amounts and kinds of the reaction materials and the reaction medium to be used. In general, the reaction temperature is not lower than 100° C., preferably not lower than 120° C. If the reaction temperature is lower than 100° C., it requires a relatively long time to form the polyamide resin. When the reaction temperature is higher than the boiling point or the sublimation temperature of the solvent to be used (as the reaction medium) or the diamine compound, the reactor is pressure-tightly closed or kept under pressure.

Like the reaction temperature described above, the reaction time required for producing the polyamide resin varies depending upon various factors. In general, the reaction time is in the range of 0.2–100 hours, preferably 0.5–50 hours. If the reaction time is less than 0.2 hour, the formation of the polyamide resin is insufficient. On the other hand, the reaction time exceeding 100 hours does not significantly enhance the formation of the polyamide resin. Further, the polyamide resin to be obtained tends to be gel which is insoluble and infusible.

When the reaction for producing the polyamide resin is terminated, the polyamide resin as a reaction product which is present in the reaction medium is separated and collected therefrom. If the polyamide resin is dispersed in the form of a slurry in the reaction medium, the polyamide resin slurry is collected from the reaction medium. If the polyamide resin is dissolved in the reaction medium, the reaction medium is dried by spraying so as to collect the polyamide resin. Alternatively, the dissolved polyamide resin is deposited by using a suitable precipitant, and then subjected to known filtration or centrifugation to collect the polyamide resin. The thus collected polyamide resin is completely dried according to a known drying method such as hot gas drying or vacuum drying, so as to provide a desired polyamide resin. When the polyamide resin is obtained by the reaction of the linear polyester resin and the diamine compound in the predetermined reaction medium, it has an intrinsic viscosity generally of not less than 0.5 dl/g, and up to as high as 2.5 dl/g. When the polyamide resin is obtained by the reaction of the ester composition consisting of the polyalkylene terephthalate resin and the dicarboxylic ester, and the diamine compound in the predetermined reaction medium, it has an intrinsic viscosity generally in the range of 0.3–2.5 dl/g.

The polyamide resin obtained as the reaction product according to the present invention may be subjected to the solid-polycondensation or the melt-polycondensation, as needed, for further increasing its molecular weight.

Described more specifically, the solid-polycondensation is effected for increasing the degree of polymerization of the obtained polyamide resin while it is kept in a solid state. More specifically explained, the polyamide resin is heated to a temperature within a range between a temperature 50° C. higher than the glass-transition temperature of the polyamide resin and the melting point of the polyamide resin, preferably within a range between a temperature 80° C. higher than the glass-transition temperature and a temperature 20° C. lower than the melting point of the polyamide resin. This heat treatment is effected under a reduced pressure of not more than 1000 Pa, preferably not more than 300 Pa, or in the presence of an inert gas. Although the time period during which the heat treatment is effected varies depending upon the temperature, the amount of the polyamide resin as the reaction product and the configuration of the device to be used, it is preferable to effect the heat treatment generally for 0.2–20 hours, preferably for 0.5–10 hours.

The melt-polycondensation is effected for increasing the degree of polymerization of the obtained polyamide resin while it is kept in a molten state, such that a shearing force is applied to the molten polyamide resin while it is kept under a reduced pressure or in the presence of an inert gas. The shearing force is applied to the molten polyamide resin at a temperature within a range between a temperature higher than the melting point of the polyamide resin as the reaction product and a temperature lower than the decomposition temperature of the polyamide resin, preferably in a range between a temperature higher than the melting point of the polyamide resin as the reaction product by at least 20° C. and a temperature lower than the decomposition temperature of the polyamide resin by at least 30° C. The melt-polycondensation in which the shearing force is applied to the molten polyamide resin is effected by using any suitable device which is capable of kneading a polymer having a high viscosity under heat, such as a roll, extruder, or kneader. It is preferable to use a vent-type extruder or a kneader which assures easy kneading of the polymer at a high temperature, permits the molecular weight of the polymer to sufficiently increase in a relatively short period of time and facilitates retrieval of the polyamide resin. As the extruder, a single-screw or multi-screw extruder is used. The reaction by-product is removed through the vent of the extruder under a reduced pressure. Thus, the polyamide resin having a high molecular weight is easily obtained in the form of pellets in a short period of time. The reduced pressure is not higher than 1000 Pa, preferably not higher than 300 Pa. The molten polyamide resin is subjected to the shearing force for 0.2–15 minutes, preferably for 0.5–10 minutes.

To the polyamide resin obtained as described above, there are added, as needed, various known additives such as a heat stabilizing agent, a light stabilizing agent, a coloring agent, a lubricant, a reinforcing agent and a filler. Then, the polyamide resin is formed into a desired product according to a known molding method such as compression molding, injection molding or extrusion. The polyamide resin may be used for forming a film by casting, or a coating layer while the polyamide resin is dissolved in a suitable solvent.

EXAMPLES

To further clarify the present invention, there will be described some examples of the present invention. It is to be understood that the present invention is not limited to the details of the following examples, but may be embodied with various changes, modifications and improvements which may occur to those skilled in the art without departing from the scope of the present invention defined in the attached claims.

Example 1

Commercially available bottles made of a PET resin were collected and washed. Then, the PET bottles were pulverized and passed through a 10-mesh sieve. The thus obtained recycled PET resin powder was dried at 130° C. for three hours. The water content of the dried PET resin powder (measured by a measuring device available from MITSUBISHI KAGAKU CO., Ltd., Japan) was 100 ppm. The intrinsic viscosity [η] of the obtained PET resin powder was 0.65 dl/g.

1 part by weight of hexamethylene diamine (HMD) as the diamine compound, which is available from WAKO JUNYAKU KOGYO CO., Ltd., Japan, and 10 parts by weight of sulfolane (the aprotic protophobic polar solvent) as the reaction medium, which is an anhydrous product available from TOKYO KASEI CO., Ltd., Japan, were mixed. The mixture solution was dehydrated by using a molecular sieve 4A (available from WAKO JUNYAKU KOGYO CO., Ltd., Japan), so that the water content of the mixed solution was adjusted to 400 ppm.

110 g of the PET resin powder prepared as described above and 730 g of the above dehydrated mixed solution (which contains 66 g of HMD that is an equivalent molar amount for the PET resin as calculated in the repeating unit of the PET resin) were introduced into a 1L-capacity autoclave. The atmosphere in the autoclave was substituted by nitrogen gas, and the autoclave was pressurized to 1 MPa by nitrogen gas. After the autoclave was pressure-tightly closed, the mixture in the autoclave was heated while it was stirred. The mixture was held at 180° C. for ten hours. Thereafter, the temperature of the autoclave was lowered to the room temperature. After the obtained reaction product was subjected to filtration, it was washed with a large amount of ethanol. Then, the reaction product was again subjected to filtration, and vacuum-dried at 120° C. for 24 hours, whereby the reaction product was obtained in the form of a powder.

FT-IR spectrum analysis of the thus obtained powdered reaction product revealed that the absorption wave number band of the ester is entirely eliminated and the absorption wave number band of the amide appears. Judging from this fact and the intrinsic viscosity of the obtained reaction product (as shown in the following TABLE 1), it is recognized that the diol component in the PET resin was substituted by the diamine compound, to thereby provide a polyamide resin having a molecular weight sufficient for practical use. The polyamide resin obtained in the Example 1 was examined of its yield, amidation ratio, intrinsic viscosity, and melting point (Tm). The results are also shown in the TABLE 1.

Example 2

The amidation reaction of the PET resin powder was effected in the same manner as in the above Example 1, except that N-methylpyrrolidone (hereinafter referred to as "NMP") available from WAKO JUNYAKU KOGYO, CO., Ltd., Japan was used as the reaction medium in place of sulfolane used in Example 1. The water content of the mixed solution consisting of HMD and NMP was 105 ppm.

It was confirmed that the obtained reaction product was a polyamide resin. As in the above Example 1, the physical properties of the polyamide resin obtained in this Example 2 were examined. The results are shown in TABLE 1.

Comparative Example 1

The amidation reaction of the PET resin powder was effected in the same manner as in the above Example 1, except that N,N-dimethyl acetamide which is an anhydrous product used for organic synthesis and available from WAKO JUNYAKU KOGYO, CO., Ltd., Japan was used as the reaction medium in place of sulfolane. The N,N-dimethyl acetamide is an aprotic protophilic polar solvent. The water content of the mixed solution consisting of the diamine compound (HMD) and the solvent was 105 ppm.

The physical properties of the obtained reaction product were examined in the same manner as in the above Example 1. The results are indicated in TABLE 1.

Comparative Example 2

The amidation reaction of the PET resin powder was effected in the same manner as in the above Example 1, except that dimethyl sulfoxide (hereinafter referred to as "DMSO") which is an anhydrous product used for organic synthesis and available from WAKO JUNYAKU KOGYO, CO., Ltd., Japan was used as the reaction medium in place of sulfolane. The dimethyl sulfoxide is an aprotic protophilic polar solvent. The water content of the mixed solution consisting of the diamine compound (HMD) and the solvent was 92 ppm.

The physical properties of the obtained reaction product were examined in the same manner as in the above Example 1. The results are indicated in TABLE 1.

TABLE 1

| | Examples | | Comparative examples | |
|---|---|---|---|---|
| | 1 | 2 | 1 | 2 |
| yield (g) | 141 | 145 | 49 | 56 |
| (%*1) | (100) | (103) | (35) | (40) |
| amidation ratio*2 | 1.00 | 0.98 | 0.85 | 0.70 |
| intrinsic viscosity [η]*3 (dl/g) | 1.3 | 0.52 | 0.07 | 0.10 |
| melting point Tm*4 (° C.) | 345 | 320 | not confirmed | not confirmed |

*1: percentage obtained by dividing the yield (g) by the stoichiometric amount of 141 g represented by the following formula on the assumption that all ester groups are converted into amide groups:

TABLE 1-continued

| | Examples | | Comparative examples | |
|---|---|---|---|---|
| | 1 | 2 | 1 | 2 |

$$\text{+}\!\!\left(\!\!\overset{O}{\underset{\|}{C}}\!\!-\!\!\left\langle\!\!\!\bigcirc\!\!\!\right\rangle\!\!-\!\!\overset{O}{\underset{\|}{C}}\text{OC}_2\text{H}_4\text{O}\!\!\right)_{\!\!\overline{n}}\!\!+\text{n}\cdot\text{H}_2\text{NC}_6\text{H}_{12}\text{NH}_2\longrightarrow$$

MW = 192
110 g $$\text{+}\!\!\left(\!\!\overset{O}{\underset{\|}{C}}\!\!-\!\!\left\langle\!\!\!\bigcirc\!\!\!\right\rangle\!\!-\!\!\overset{O}{\underset{\|}{C}}\text{NHC}_6\text{H}_{12}\text{NH}\!\!\right)_{\!\!\overline{n}}\!\!+\text{n}\cdot\text{HOC}_2\text{H}_4\text{OH}$$

MW = 246
141 g

The yield exceeded 100% due to the apparent increase of the molecular weight of the reaction product by the addition of the diamine compound.
*2: ratio of the ester groups which were converted into the amide groups obtained according to the following equation:
amidation ratio = $\lambda_{1540}/(\lambda_{1730} + \lambda_{1540})$,
wherein $\lambda_{1730}$ represents the absorbency of the ester group at 1730 cm$^{-1}$, and $\lambda_{1540}$ represents the absorbency of the amide group at 1540 cm$^{-1}$, which absorbance values were measured by FT-IR device ("550" available from NIPPON KOUGAKU CO., Ltd., Japan) using a pellet formed from a mixture of each reaction product and KBr
*3: The intrinsic viscosity was measured at a temperature of 30° C. by using the Ubbelohde viscometer, using hexafluoroisopropanol as a solvent.
*4: The melting point Tm was measured by using TGA thermal analyzer ("SII 6200" available from SEIKO Institute CO., Ltd., Japan) in an atmosphere of nitrogen with a temperature rise at a rate of 10° C./minute.

As apparent from the results indicated in TABLE 1, the amidation ratio and intrinsic viscosity were high in the reaction products of Examples 1 and 2, wherein the aprotic protophobic polar solvents, i.e., sulfolane and N-methylpyrrolidone, were respectively used as the reaction medium. This fact indicates that the PET resin was formed into the polyamide resin at a significantly high ratio. In particular, when sulfolane was used as the reaction medium, the PET resin was substantially entirely formed into the polyamide resin.

On the contrary, the amidation ratio was insufficient and the intrinsic viscosity was too low for practical use in the reaction products of Comparative examples 1 and 2, wherein the aprotic protophilic polar solvents were used as the reaction medium. Further, the melting point was not confirmed in these reaction products.

Example 3

110 g of the PET resin powder as used in the above Example 1 and 74 g of p-phenylenediamine (available from WAKO JUNYAKU KOGYO CO., Ltd., Japan) were introduced into a 1 L autoclave, together with 400 g of sulfolane as the reaction medium. The molar amount of p-phenylenediamine is 1.2 times that of the PET resin as calculated in the repeating unit of the PET resin. The autoclave was heated at 220° C. for ten hours. After the temperature of the autoclave was lowered to room temperature, the reaction product in the autoclave was subjected to filtration, and then washed with a large amount of ethanol. Thereafter, the reaction product was again subjected to filtration, and vacuum-dried at 120° C. for 24 hours. Thus, a desired polyamide resin (as the reaction product) in the form of powder was obtained.

The thus obtained reaction product did not tend to form an aggregate, and did not adhere to the walls of the reactor. Further, the examination of the physical properties of the reaction product revealed that the obtained polyamide resin had a high degree of intrinsic viscosity suitable for practical use.

As is apparent from the above explanation, the linear polyester resin which is used in place of organic dicarboxylic acid conventionally used for producing the polyamide resin reacts, in the predetermined solvent, i.e., the aprotic protophobic polar solvent, with the diamine compound whose molar ratio is determined to be in the range of 0.5–1.5 for the polyester resin, whereby the desired polyamide resin is advantageously obtained in a simplified manner in a relatively short period of time. Further, the obtained polyamide resin has not only a significantly enhanced amidation ratio, but also a considerably high molecular weight or intrinsic viscosity even if the obtained polyamide resin is not subjected to the solid- or melt-polycondensation. Moreover, the polyamide resin produced according to the present invention does not tend to form an aggregate, and does not adhere to the walls of the reactor, whereby the polyamide resin can be produced with high production efficiency.

Example 4

Commercially available bottles made of a PET resin were collected and washed. Then, the PET bottles were pulverized and passed through a 10-mesh sieve. The thus obtained recycled PET resin powder was dried at 130° C. for three hours. The dried PET resin powder was measured of its water content by using a measuring device available from MITSUBISHI KAGAKU CO., Ltd., Japan. The water content of the PET resin powder was 100 ppm.

The ester composition according to the present invention was prepared by mixing 77 g of the PET resin powder obtained as described above and 33 g of dimethyl isophthalate available from WAKO JUNYAKU CO., Ltd., Japan. To this mixture, there were added 1 part by weight of hexamethylene diamine (hereinafter referred to as "HMD") and 10 parts by weight of o-dichlorobenzene both available from WAKO JUNYAKU CO., Ltd., Japan. The thus obtained mixed solution was passed through a column filled with a molecular sieve 4A available from WAKO JUNYAKU CO., Ltd., Japan, and dehydrated, so that the water content of the mixed solution was 50 ppm. 733 g of the above dehydrated mixed solution (which contains 66 g of HMD that is an equivalent molar amount for the PET resin as calculated in the repeating unit of the PET resin) was introduced into a 1 L-capacity autoclave, pressurized to 0.1 MPa by a nitrogen gas, and heated at 180° C. for 10 hours while the mixed solution in the autoclave was stirred. According to this reaction, the diol component in the PET resin and the monohydric alcohol component in the dimethyl isophthalate were substituted by HMD. After the temperature of the autoclave was lowered to the room temperature, the reaction product was subjected to filtration, and washed with a large amount of ethanol. Then, the reaction product was again subjected to filtration, and vacuum-dried at 120° C. for twenty four hours, whereby a desired polyamide resin was obtained.

Comparative Example 3

A similar experiment as conducted in the above Example 4 was conducted to provide a polyamide resin, except that the ester compound included only 110 g of the PET resin powder, namely, dimethyl isophthalate as used in the above Example 4 was not included in the ester compound.

For each of the polyamide resins according to the Example 4 of the present invention and according to the Comparative example 3, the melting point was measured by using a measuring device ("TG/DTA 6200" available from SEIKO Institute CO., Ltd., Japan) in an atmosphere of nitrogen with a temperature rise at a rate of 20° C./minute up to the melting point. The measurement showed that the melting point of the polyamide resin according to the present invention was 295° C. while the melting point of the polyamide resin according to the Comparative example 3 in which only the PET resin powder was used as the ester compound was 308° C.

Each of the polyamide resins obtained according to the Example 4 of the present invention and the Comparative example 3 were injection-molded by using a small-sized (30 ton) injection molding apparatus at a cylinder temperature of 305° C. At this temperature, the polyamide resin of the present invention was melted so as to flow in the molding apparatus, whereby the polyamide resin was injection-molded with high stability. On the contrary, the polyamide resin according to the Comparative example 3 was not melted at the above cylinder temperature, and therefore it could not be injection-molded. The polyamide resin of the Comparative example 3 began to flow in the molding apparatus, at an elevated temperature of 325° C. However, the polyamide resin melted at the elevated temperature suffered from continuous vapor bubbles, resulting in a failure to continue the molding.

Example 5

The amidation reaction of the PET resin was conducted in the same manner as in the above Example 4, except that 29.6 g of dimethyl adipate was used in place of 33 g of dimethyl isophthalate as used in the Example 1. The obtained reaction product (polyamide resin) was injection-molded in the same manner as in the Example 4. Like the polyamide resin of the Example 4, the polyamide resin of this Example 5 could also be molded with high stability, without suffering from the generation of the vapor bubbles.

As is apparent from the above description, the polyalkylene terephthalate resin reacts with the diamine compound in the presence of the dicarboxylic ester, whereby the desired polyamide resin is obtained. Owing to the dicarboxylic ester, the formed polyamide resin has a lowered melting point, so that the polyamide resin can be molded in a molten state at a lowered temperature without suffering from the conventionally experienced problem of generation of vapor bubbles.

In the present invention, the waste PET resin can be used as the material in the reactions as described above. Thus, the present invention advantageously permits production of the polyamide resin having a high added value, at a reduced cost in a simplified manner.

What is claimed is:

1. A method of producing a polyamide resin by reacting with at least one diamine compound, at least one linear polyester resin consisting of at least one dicarboxylic acid component and at least one diol component and having an intrinsic viscosity of not less than 0.2 dl/g, said at least one diamine compound being used in an amount of 0.5–1.5 mol per 1 mol of said at least one linear polyester resin as calculated in the repeating unit thereof, said linear polyester resin and said diamine compound being reacted in a reaction medium comprising at least one solvent selected from aprotic protophobic polar solvents, so that said at least one diol component of said linear polyester resin is substituted by said diamine compound, resulting in said polyamide resin as a reaction product.

2. A method according to claim 1, wherein an amount of said reaction medium is 100–5000 parts by weight per 100 parts by weight of said linear polyester resin.

3. A method according to claim 1, wherein said aprotic protophobic polar solvents include acetonitrile, sulfolane, 3-sulfolane and N-methylpyrrolidone.

4. A method according to claim 1, wherein said linear polyester resin is a thermoplastic polyalkylene terephthalate resin.

5. A method according to claim 4, wherein said thermoplastic polyalkylene terephthalate resin is a polyethylene terephthalate resin.

6. A method according to claim 5, wherein said polyethylene terephthalate resin is a recycled polyethylene terephthalate resin.

7. A method of producing a polyamide resin by reacting with at least one diamine compound, an ester composition which consists of: (A) 100 parts by weight of at least one polyalkylene terephthalate resin consisting of at least one dicarboxylic acid component and at least one diol component; and (B) 10–100 parts by weight of at least one dicarboxylic ester, said diamine compound being used in an amount of 0.5–1.5 mol per 1 mol of said ester composition wherein said polyalkylene terephthalate resin is calculated in the repeating unit thereof, said ester composition and said diamine compound being reacted in a reaction medium comprising at least one solvent selected from the group consisting of hydrocarbons, halogenated hydrocarbons, ethers, acetals and aprotic protophobic polar solvents.

8. A method according to claim 7 further comprising a step of effecting polycondensation in a solid state or molten state so as to increase a degree of polymerization of said reaction product.

9. A method according to claim 8, wherein said polycondensation in a molten state is effected at a reduced pressure by applying a shearing force to said reaction product while said reaction product is maintained in a molten state.

10. A method according to claim 7, wherein said dicarboxylic ester is ester of an aliphatic or aromatic dicarboxylic acid and a monohydric alcohol.

11. A method according to claim 7, wherein said polyalkylene terephthalate resin is a polyethylene terephthalate resin.

12. A method according to claim 11, wherein said polyethylene terephthalate resin is a recycled polyethylene terephthalate resin.

\* \* \* \* \*